(12) United States Patent
Bohn et al.

(10) Patent No.: US 6,183,241 B1
(45) Date of Patent: Feb. 6, 2001

(54) UNIFORM-BURNING MATRIX BURNER

(75) Inventors: Mark S. Bohn, Golden; Mark Anselmo, Arvada, both of CO (US)

(73) Assignee: Midwest Research Institute, Kansas City, MO (US)

( * ) Notice: Under 35 U.S.C. 154(b), the term of this patent shall be extended for 0 days.

(21) Appl. No.: 09/248,065

(22) Filed: Feb. 10, 1999

(51) Int. Cl.$^7$ ........................................... F23D 3/40
(52) U.S. Cl. .................. 431/326; 431/328; 431/170; 431/177; 122/DIG. 3; 432/223; 165/154
(58) Field of Search ................................. 431/326, 328, 431/329, 170, 172, 174, 176, 177, 7, 78, 77; 126/391; 122/DIG. 3, 155.2, 155.4, 159, 160, 166.1, 181; 432/223, 179, 160; 165/154, 164

(56) References Cited

U.S. PATENT DOCUMENTS

| | | | |
|---|---|---|---|
| 1,213,470 | * 1/1917 | Finley | 431/328 |
| 2,343,049 | * 2/1944 | Fassinger, Sr. | 165/154 |
| 3,179,156 | * 4/1965 | Weiss et al. | 431/328 |
| 3,671,174 | * 6/1972 | Reid, Jr. | 431/326 |
| 3,829,285 | * 8/1974 | Beck | 165/154 |
| 5,181,846 | * 1/1993 | Chang | 431/78 |
| 5,205,731 | 4/1993 | Reuther et al. . | |
| 5,211,552 | * 5/1993 | Krill et al. | 431/7 |
| 5,476,375 | 12/1995 | Khinkis et al. . | |
| 5,496,171 | 3/1996 | Ozawa et al. . | |
| 5,522,723 | 6/1996 | Kurst et al. . | |
| 5,603,905 | 2/1997 | Bartz et al. . | |
| 5,667,374 | 9/1997 | Nutcher et al. . | |
| 5,711,661 | 1/1998 | Kushch et al. . | |
| 5,749,720 | 5/1998 | Fukuda et al. . | |

* cited by examiner

Primary Examiner—Ira S. Lazarus
Assistant Examiner—Josiah C. Cocks
(74) Attorney, Agent, or Firm—Paul J. White; Ken Richardson (57) ABSTRACT

Computer simulation was used in the development of an inward-burning, radial matrix gas burner and heat pipe heat exchanger. The burner and exchanger can be used to heat a Stirling engine on cloudy days when a solar dish, the normal source of heat, cannot be used. Geometrical requirements of the application forced the use of the inward burning approach, which presents difficulty in achieving a good flow distribution and air/fuel mixing. The present invention solved the problem by providing a plenum with just the right properties, which include good flow distribution and good air/fuel mixing with minimum residence time. CFD simulations were also used to help design the primary heat exchanger needed for this application which includes a plurality of pins emanating from the heat pipe. The system uses multiple inlet ports, an extended distance from the fuel inlet to the burner matrix, flow divider vanes, and a ring-shaped, porous grid to obtain a high-temperature uniform-heat radial burner. Ideal applications include dish/Stirling engines, steam reforming of hydrocarbons, glass working, and any process requiring high temperature heating of the outside surface of a cylindrical surface.

24 Claims, 7 Drawing Sheets

UNIFORM-BURNING MATRIX BURNER

The United States Government has rights in this invention under Contract No. DE-AC36-98GO-10337 between the United States Department of Energy and the National Renewable Energy Laboratory, a division of Midwest Research Institute.

FIELD OF INVENTION

The present invention relates to an inward-burning, gas-fired matrix burner capable of providing extremely high spatially uniform temperatures and high burner efficiencies with low NOx emissions.

BACKGROUND OF THE INVENTION

Dish/Stirling Systems engines generate electricity by focusing solar energy with a parabolic dish concentrator onto the heat-input end of a Stirling engine. This arrangement is of interest because it provides the potential for high solar-to-electrical conversion efficiencies, and low costs can be achieved with mass production. Applications include utility scale generation, grid support, village electrification, remote power, end-of grid power and irrigation pumping.

Successful implementation of dish/Stirling systems requires hybrid operation (fossil-fuel co-firing) via reliable, efficient burner systems that can be installed at a capital cost increment competitive with conventional means for providing electricity from fossil fuels in a given market, e.g., diesel generator sets. Burner system lifetime is also a concern as are air emissions in many markets.

In most applications, a hybrid capability is needed to maintain operation at night or under cloudy conditions. In a hybrid installation, there is a thermal interface between the concentrated solar flux and the heat input end of the engine. The thermal interface can be a sodium heat pipe receiver which allows heat input from a burner as well as the parabolic solar dish concentrator. Metal matrix burners have received a great deal of attention lately because of their ability to burn fossil fuels with very low emissions of nitrogen oxides. In this type of burner, a premixed air/fuel stream flows through a porous metal matrix. A significant fraction of the heat of combustion is released as infrared radiation from the matrix. Because of this heat removal from the combustion zone, maximum temperatures are well below the adiabatic flame temperature resulting in emissions of nitrogen oxides (NOx) as low as 10 ppm at 0% oxygen without exhaust gas recirculation.

Matrix burners have typically been used in an outward burning arrangement in which air and fuel mixing takes place inside a cylinder-shaped matrix, and combustion occurs as the mixture flows radially outward through the matrix. In many applications, however, a cylindrical inward burning approach is needed. This approach has been avoided in the past because of the difficulty of obtaining uniform flow and uniform burning in the matrix.

The present invention teaches that flow distributors could be used and still maintain a low pressure drop. One problem is that there are a large number of possible configurations. Using a build-and-test approach, it would be expensive and time-consuming to test even a single configuration. Even after a proposed design is built, it would be very difficult to place instruments in the plenum, and so engineers could only learn the temperature and flow conditions at a few points. This would make it impossible to measure the flow patterns in the plenum, so engineers would be able to gain little understanding of why their design alternatives did not work.

The present invention uses Computational Fluid Dynamics, CFD, to evaluate the inlet plenum and flow distributor configurations. A CFD analysis solves the fundamental controlling equations and provides fluid velocity, species, pressure and temperature values at every point in the solution domain. This allows engineers to optimize fluid flow patterns or temperature distributions by adjusting either the system geometry or the boundary conditions, such as inlet velocity and temperature, wall heat flux, etc. Of particular benefit to this application is the fact that CFD enables detailed parametric studies that make it possible to optimize a design with relatively little time and expense.

FLUENT™ software from Fluent Inc. is used to perform the analysis. (Fluent, Inc., USA, 10 Cavendish Court, Centerra Resource Park, Lebanon, N.H., 03766-1442, Tel.: (603) 643-2600.) Modeling is done to determine if the preheated air/fuel mixture would pre-ignite (burn upstream of the burner matrix). This is important because high temperature applications require recuperation of exhaust gas energy via combustion air preheat to achieve good thermal efficiency.

The plenum forms a cylindrical annulus and distributes the air and fuel from four inlet pipes to the outside of the burner matrix. With the geometry imported, engineers create the mesh and run analysis iterations to model a uniformly-heated matrix which doesn't pre-ignite. In addition, uniform mixing of the air and fuel are critical. In constructing a prototype for an application specific dish/Stirling engine, a sodium heat pipe was necessary.

After solving the flow distribution problem, the inventors herein turned their attention to the primary heat exchanger. This device transfers heat from the combustion gases to the heat pipe. The design requirements were 75 kW heat transfer to the heat pipe, 5000 Pascal pressure drop and 1150° K maximum metal temperature.

Analysis showed that strip fins provided inadequate heat transfer and would likely be subject to excessive thermal stress. Pin fins were found to provide adequate heat transfer, acceptable pressure drop and were not expected to suffer from significant thermal stress. The combustion gas flow begins in a radial direction along the pin axes and then turns across the pin axes. In addition, significant temperature change in the exhaust gas and resulting large property variations preclude the use of existing correlations. Finally, radiation heat transfer is an additional complicating factor that could be incorporated in the CFD work. Other applications such as air flowing through an open pipe might place pin fins inside the pipe, and might remove them from the outside of the pipe.

The next step was building a one/sixth scale prototype to validate the model. This system was designed and built in collaboration with engineers at Sandia National Laboratories, Albuquerque, N.Mex., and provided the capability to test all features of the burner, primary heat exchanger, and heat pipe. In this prototype system, only the heat pipe diameter was reduced to $\frac{1}{6}^{th}$ full scale, all other dimensions were maintained at their full-scale values. The system was operated with the air/fuel mixture preheated up to 675° C., thus validating the CFD calculations used to predict pre-ignition. Prototype test data showed very close correlation to the CFD results. Pressure drop across the primary heat exchanger and heat transfer through the primary heat exchanger agreed to within about 10% of the CFD results. Maximum pin tip temperature, agreed to within 10° C. of the CFD model.

Summarized below are related patents in the art.

U.S. Pat. No. 5,749,720 (1998) to Fukuda et al. discloses a radially inward burning matrix burner which discharges the exhaust fumes into the central heat pipe. The collar-shaped intake manifold allow the fuel/air mixture to cool the matrix support clips to prevent pre-ignition. A single intake port supplies the fuel air mixture for the entire circumference of the ring-shaped matrix. No pre-heating of the fuel/air mixture is possible due to the unaddressed problems of pre-ignition which pre-heating creates. No suggestion of how to provide uniform circumferential burning is made wherein only a single inlet port is shown. Non-uniform burning results in burner matrix hot spots which forces an average lower burner throughput to prevent matrix damage. Thus, Fukuda et al. teaches an inefficient, oversized gas burner.

U.S. Pat. No. 5,667,374 (1997) to Nutcher et al. discloses an in-line (not radial) gas burner having a ceramic honey-comb with a plurality of axial passageways to form a planar flame face offering low NOx levels. An in-line plenum has a bluff body to thoroughly mix the fuel/air mixture before combustion in the honeycomb. A mesh flame trap is used to prevent pre-ignition. There are no suggestions of pre-heating the fuel.

U.S. Pat. No. 5,711,661 (1998) to Kushch et al. discloses a multi-layered matrix burner having at least three porous layers creating a three-dimensional array with the flame at the downstream porous layers. High-intensity applications are taught in the range of 1,500,000 BTU/hr/ft.$^2$ with large turndown ratios.

U.S. Pat. No. 5,603,905 (1997) to Bartz et al. discloses a hazardous waste combustion burner having a box-like construction of foraminous surfaces and a cooling column below.

U.S. Pat. No. 5,496,171 (1996) to Ozawa et al. discloses a round matrix burner having a flat, round burn surface which has a central burn area having a separate plenum feeding a lean fuel mixture. A second peripheral plenum has a rich fuel mixture which prevents a "lift" phenomenon of the flames. NOx emissions are reduced.

U.S. Pat. No. 5,205,731 (1993) to Reutter el al. discloses an axial flow nested fiber matrix burner which results in blue flame operation with low NOx levels comparable to radiant mode burners but with eight to ten times higher port loadings.

Figure 2:
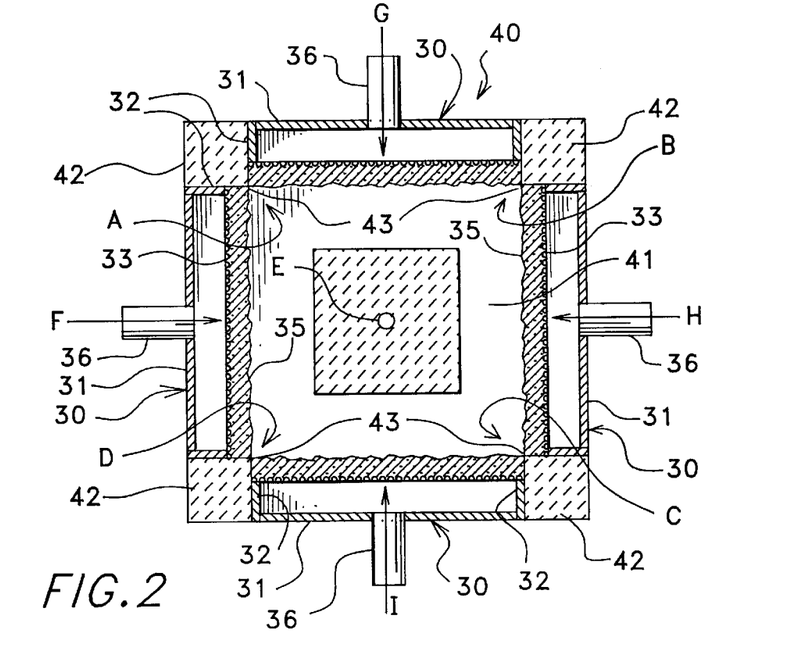
FIG. 2 (prior art) is a sectional view of an inward-burning matrix burner.

U.S. Pat. No. 5,211,552 (1993) to Krill et al. discloses a radially inward burning matrix burner in FIGS. 3, 4, 6, and 7. A refractory body reradiates heat from inside the combustion cavity to the matrix combustion surface. The combustion cavity acts as an exhaust port to exit the heat and exhaust gases. The combustion cavity must be devoid of a heat exchange means or used only to preheat air. The excess air in the range of 50–150% in excess of the stoichiometric requirement creates an invisible flame and a product gas of not more than 10 ppm NOx, 30 ppm CO and 10 ppm UHC. The embodiment of FIG. 6 is a square version of a radial burner having an intake manifold with four equally spaced inlet ports. No plenum design nor uniform flow measures are taught.

This invention only teaches a burner that develops useable heat only in the form of a super-heated exhaust gas created from more than 50% excess air while maintaining a clean burner. The burner pre-heats some of the air in the fuel/air mixture. Excess air is required in all matrix burners, otherwise the matrix will run too hot and burn out. All contemporary burners use excess air for this reason and also to reduce emissions.

U.S. Pat. No. 5,476,375 (1995) to Khinkis et al. discloses an in-line two-stage matrix burner which introduces a second oxidant into the porous bed.

U.S. Pat. No. 5,522,723 (1996) to Durst et al. discloses a combustion chamber having a porous matrix with pore-size increases from the inlet to the outlet to create a multi-zone burner.

The closest known prior art is Krill et al. shown herein as FIG. 2. FIG. 2 forms a furnace 40 useful for the practice of Krill's invention by having four surface combustors 30 arranged to provide a square adiabatic zone 41. Where each pair of combustors 30 meet at right angles to one another, a refractory post 42 is cemented to the side walls 32 of the contiguous burners 30 so that the products of combustion or flue gas cannot leak along the vertical (normal to FIG. 2) juncture line 43 of contiguous burners 30. By this arrangement, the four burners 30 act as an inwardly fired furnace. In short, FIG. 2 demonstrates that a furnace may be formed of modular burners 30. Likewise, preferably furnace 40 has a square refractory core 44 set in its center so that infrared radiation from the four porous fiber layers 35 will impinge thereon. Optional core 44 serves as a refractory column. It is understood that furnace 40 will have a base slab and a top slab with a stack opening.

Metal pan 31 has side walls 32 with screen 33 welded to the ends 34 of side walls 32. A porous layer 35 of ceramic fibers is deposited on, and attached to, screen 33. The porous layer 35 provides the exposed surface at which a mixture of fuel gas and air will burn without visible flame and become radiant. The fuel gas-air mixture is fed to combustor 30 through pipe 36 connected to metal pan 31.

The Krill device cannot produce uniform heat around center point E because of the varying distances from E to the corners and sides of the furnace. Also, the maximum burn temperatures cannot be achieved for the matrix 35 without creating hot spots at corners A, B, C, D due to the radiation view factor between surfaces near the corners. Therefore, Krill's furnace 40 fails to achieve a maximum heat output within his given geometry, thus using materials in construction and complicating construction costs with leak-prone corners A, B, C, D. It is estimated the Krill's device would only be half as efficient in heat out per area of burner as compared to the present invention. Krill does not teach a solution to uniform flow through the plenum with his preheated air/fuel mixture. Therefore, based on experimental modeling and successful prototyping used to develop the present invention, Krill will develop hot spots at the matrix centers at points F, G, H, I. Problems with these hot spots and those at the corners of the rectangular plenum will force Krill's furnace to run at less than maximum temperatures and throughput. Another drawback to Krill's furnace is the lack of heat exchange means in the furnace except for preheated fuel/air mixture. Krill's system is designed to exhaust hot air into a space for applications such as heating a greenhouse or to dry rice with excess air in the range of 60–120% and a clean (less than 10 ppm NOx) flue gas. Krill's system is not suited for heating external surfaces as required in numerous applications.

The present invention supplies a high-temperature uniform heat via a cylinder-shaped radial burner. The curved plenum, porous mesh, divider vanes, multiple inlet ports, and extended upstream fuel/air mixing point provide for uniform distribution of a preheated fuel/air mixture which avoids pre-ignition by limiting the residence time in the plenum to less than 100 msec.

SUMMARY OF THE INVENTION

The main aspect of the present invention is to provide a cylindrical inward-burning matrix burner which has a uniform temperature.

Another aspect of the present invention is to have low NOx emissions from the burner.

Another aspect of the present invention is to provide a high-heat to burner surface ratio, thereby reducing burner size and costs.

Other aspects of this invention will appear from the following description and appended claims, reference being made to the accompanying drawings forming a part of this specification wherein like reference characters designate corresponding parts in the several views.

The present invention in the preferred embodiment shapes a plenum generally like a torus having a flat inside surface. This flat inside surface is comprised of an inward-burning matrix. At least four equally spaced inlet ports feed the plenum with a preheated fuel/air mixture with combustion air flow of 50%–150% in excess of the stoichiometric requirement. In the plenum the residence time is limited to under 100 msec. Also in the plenum, is a porous mesh and vanes which together keep each inlet port air limited to its quadrant. To ensure complete and uniform mixing of the inlet air/fuel mixture before it burns on the matrix burn surface to allow adequate fuel/air mixing. The fuel is injected a sufficient distance upstream from the matrix surface to allow adequate fuel/air mixing, but not too far upstream to allow excess residence time, thereby causing pre-ignition. In this manner, pre-ignition is eliminated while maximum burn temperatures and low NOx outputs (10 ppm–20 ppm NOx, at 0% $O_2$ using 640° C. preheated air/fuel) are achieved.

In the preferred embodiment, a central pipe or other surface to be heated is placed inside the radially burning matrix. The heat pipe can have a plurality of heat transfer enhancement pins projecting outward to more efficiently transfer heat from the burner to the heat pipe. An exhaust manifold directs the flue gas away to optionally be used to preheat the air/fuel mixture. An alternate embodiment has holes in the pipe to mix the flue gas with the process gas in the pipe.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
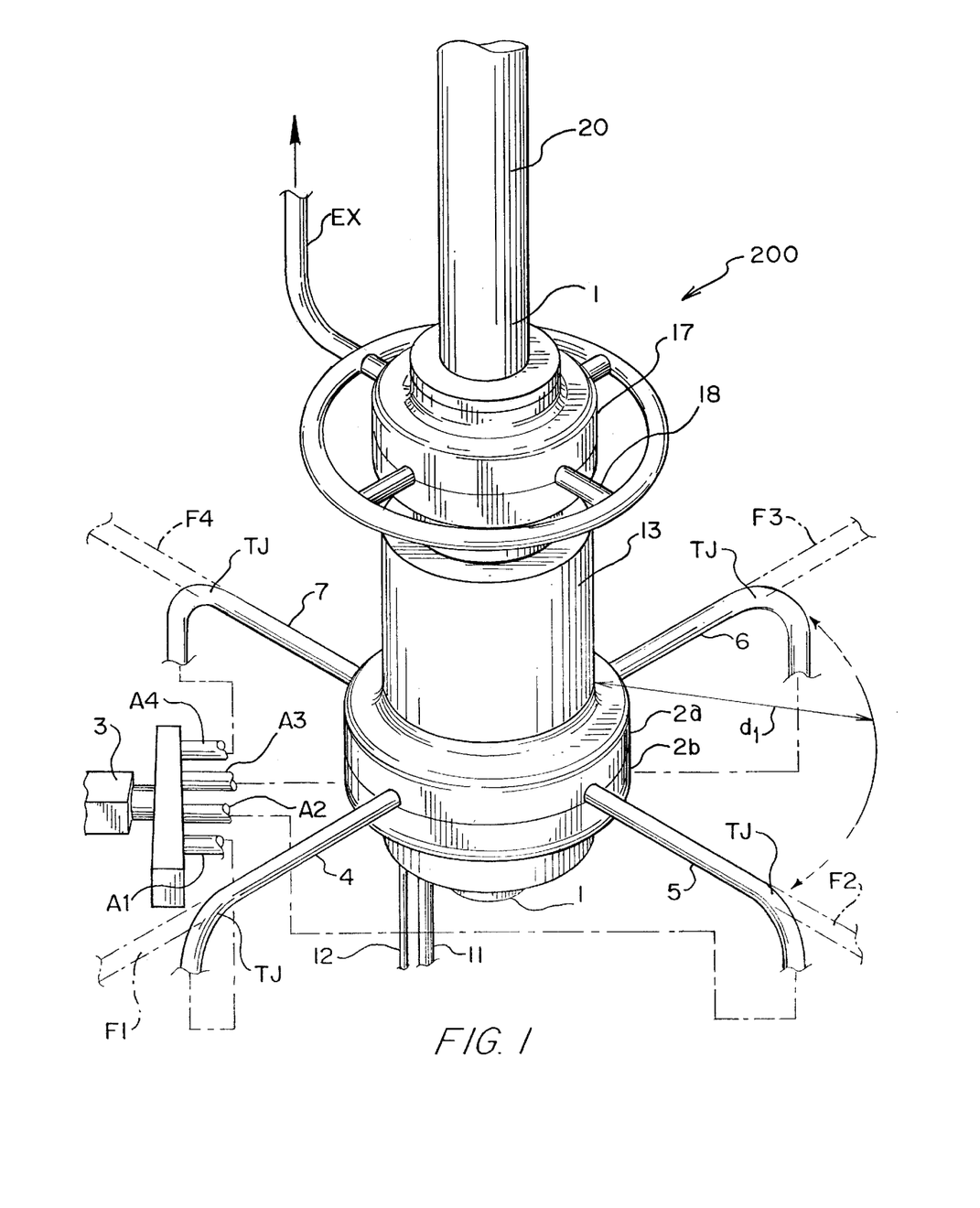
FIG. 1 is a top perspective view of a prototype system embodying the inventive concepts of the preferred embodiment.
Figure 3:
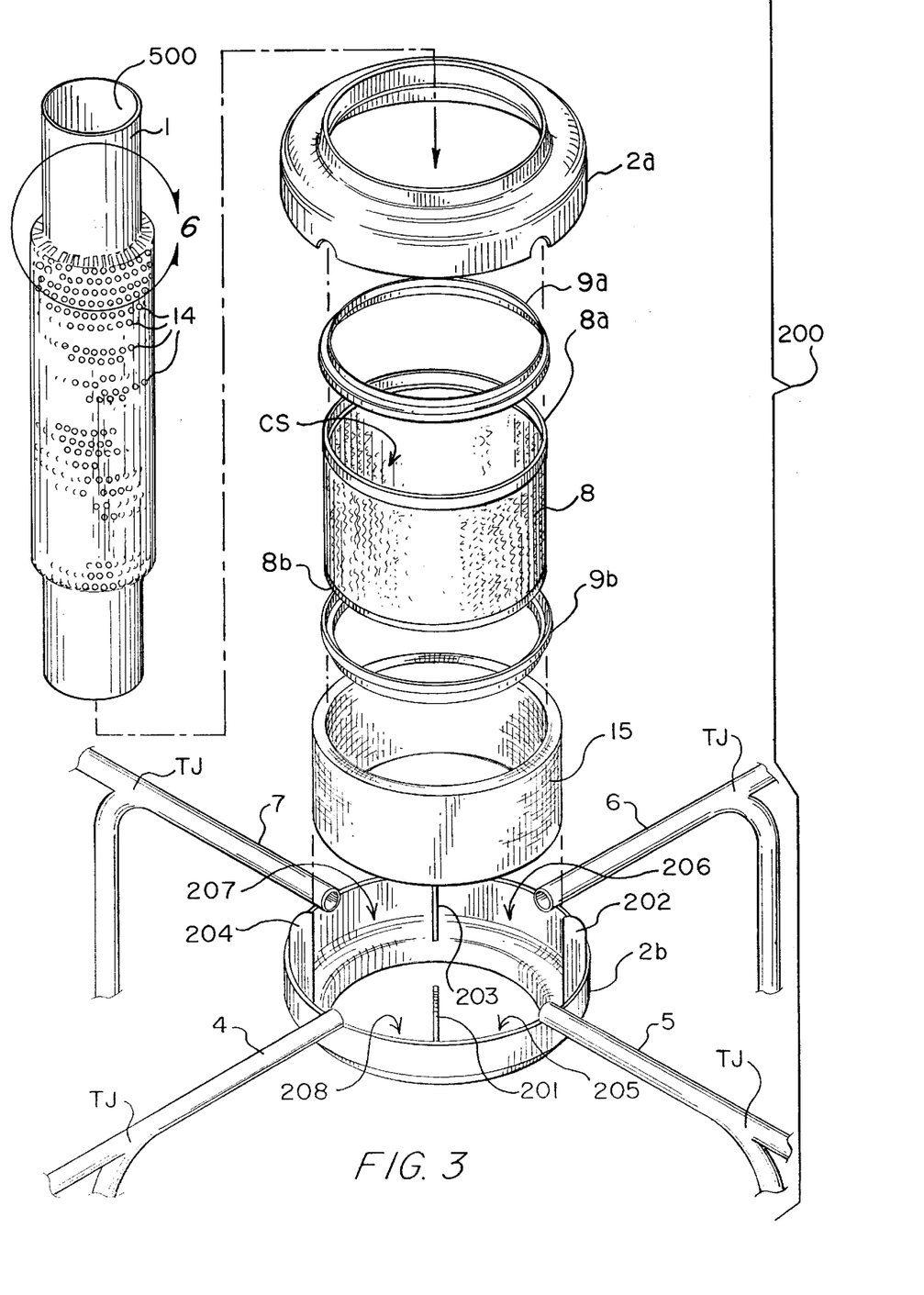
FIG. 3 is an exploded view of the embodiment shown in FIG. 1.
Figure 4:
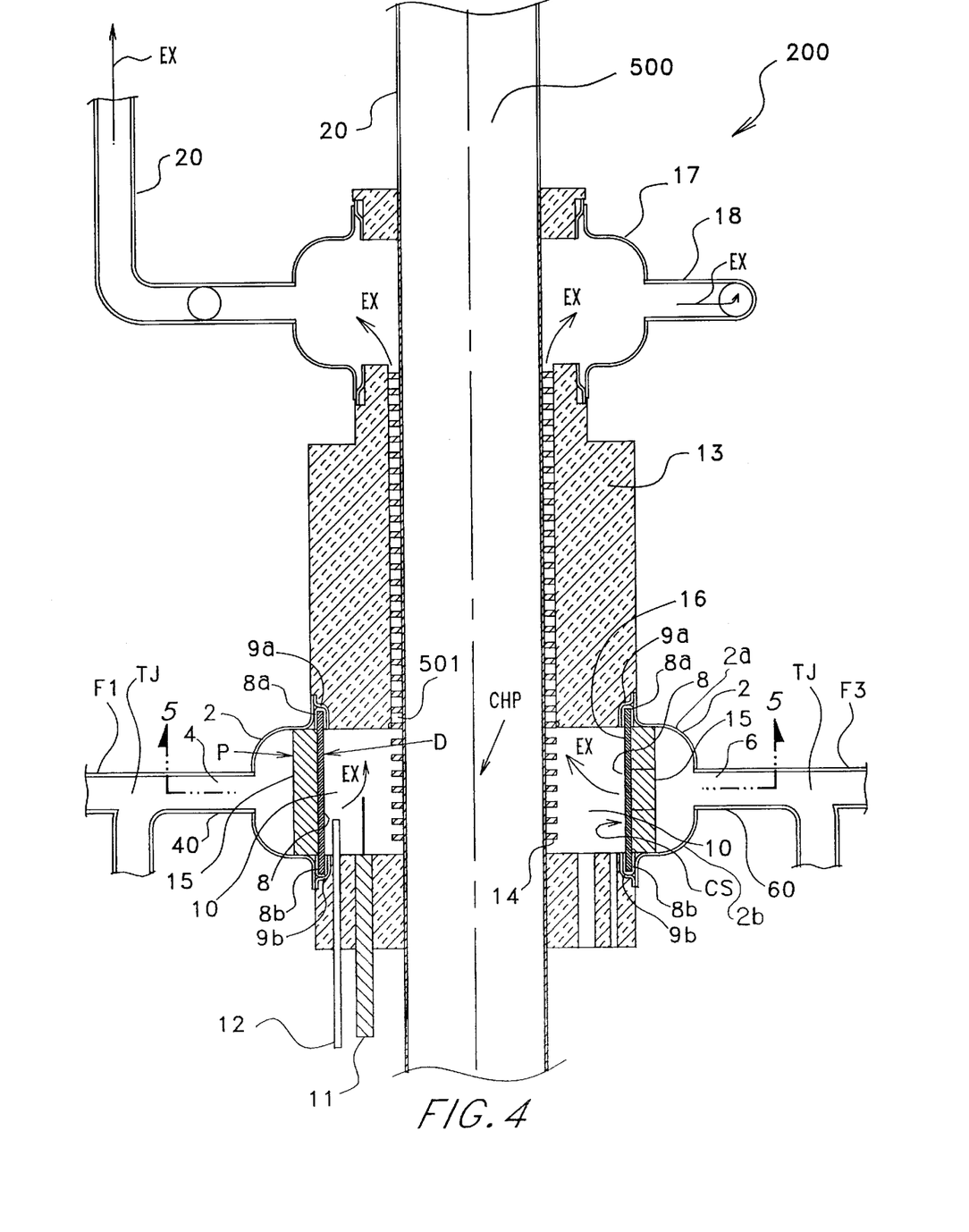
FIG. 4 is a longitudinal sectional view of the embodiment shown in FIG. 1.

Referring first to FIGS. 1, 3, 4 a heat pipe 1 may be used to heat a dish/Stirling engine wherein a fluid inside the heat pipe is flowing and is heated by the radial burner 200. Air and fuel are mixed upstream from T junction TJ. In this embodiment, the air is preheated in the manifold 3. Air/fuel inlet pipes 4, 5, 6, 7 are equidistant from one another and feed the air/fuel mixture into inlet plenum 2. Fuel pipes are denoted F1, F2, F3, F4, and air pipes A1, A2, A3, A4. The inlet plenum 2 is shaped as a cylindrical annulus wherein the inside diameter comprises a burner sheet 8 also known as a burner matrix. A space 10 is formed between the heat pipe I and the burner matrix 8. An igniter 11 (preferably located less than 2 cm from the matrix 8) ignites the air/fuel mixture, and the flame-sensing thermocouple 12 shuts off the fuel/air mixture in the absence of flame. A refractory 13 contains and directs the heat generated by the burner matrix 8 against the heat pipe 1. The heat pipe 1 has heat transfer enhancing pins 14 (also known as pin fins) emanating radially from the outside of the heat pipe 1. A distributor screen 15 surrounds the burner matrix 8. The distributor screen 15 is also known as a uniform flow mesh or laminate screen. The uniform flow mesh 15 is critical to the operation of the invention. The uniform flow mesh 15 must develop in excess of one-inch water column pressure drop across the combined thickness of the uniform flow mesh 15 and the burner matrix 8 shown as PD. Preferably, the uniform flow mesh is a pressed wire stainless steel mesh. Equivalents include perforated sheets and wire cloths. The inlet air/fuel mixture temperature ranges from 640° C.–675° C., with the air temperature at approximately 700° C. or higher mixing with the ambient temperature natural gas fuel. To prevent pre-ignition of the air/fuel mixture in the plenum 2, the residence time of the air/fuel mixture in the plenum 2 must be less than 100 msec from the mixing point TJ to the combustion surface 16. Preferably the distance d, from the meeting point TJ to the combustion surface CS ranges from 50–100 mm.

Exhaust gases EX flow from the space 10 along the heat pipe 1, first parallel to the pin fins 14 and then across the pin fins 14, into the exhaust manifold 17 and out the exhaust pipe 18. Preferably, the pin fins are made of stainless steel or high nickel alloy, have a diameter of ⅛ inches, a height of ¼ inches, and a spacing of ¼ inches. Also preferred in the present invention is a bell-shaped plenum 2 as shown. Angular corners would create excess thermal stress and fabrication problems. The best radius of curvature in the prototype was 0.787 inch with a plenum depth $d_2$ of 1.380 inch.

Optionally, the exhaust gas Ex may be piped back to preheat the intake air at 20 with a known heat exchanger (not shown). In all cases the process gas PG will flow down the heat pipe 1. One embodiment not shown provides holes in the heat pipe 1 opposite the burner matrix 8 to mix the exhaust gas EX with the process gas PG.

In FIG. 3 an exploded view of the radial burner 200 without the refractory and exhaust manifold is shown. U-shaped circular brackets 8a, 8b secure the upper and lower matrix 8. A seal is formed between 8a and 8b rims 9a and 9b and 2a and 2b through welding. The plenum consists of parts 2a, 2b. Improved performance is achieved with divider vanes 201, 202, 203, 204 in the plenum 2 which create separate plenum chambers 205, 206, 207, 208 in between each pair of divider vanes. An amazing ±3° C. uniform burn temperature has been achieved on combustion surface CS. An air/fuel inlet pipe 4, 5, 6, 7 feeds the center of each plenum chamber 205, 206, 207, 208 as shown. Although there may exist slightly different burn rates in each plenum chamber, unpredictable quadrant-to-quadrant circulation is eliminated with the divider vanes. These unpredictable flows contribute to non-uniform burning. The preferred embodiment shown still produces a uniform radial heat which is uniform around the central axis CHP of the heat pipe 1.

Figure 5:
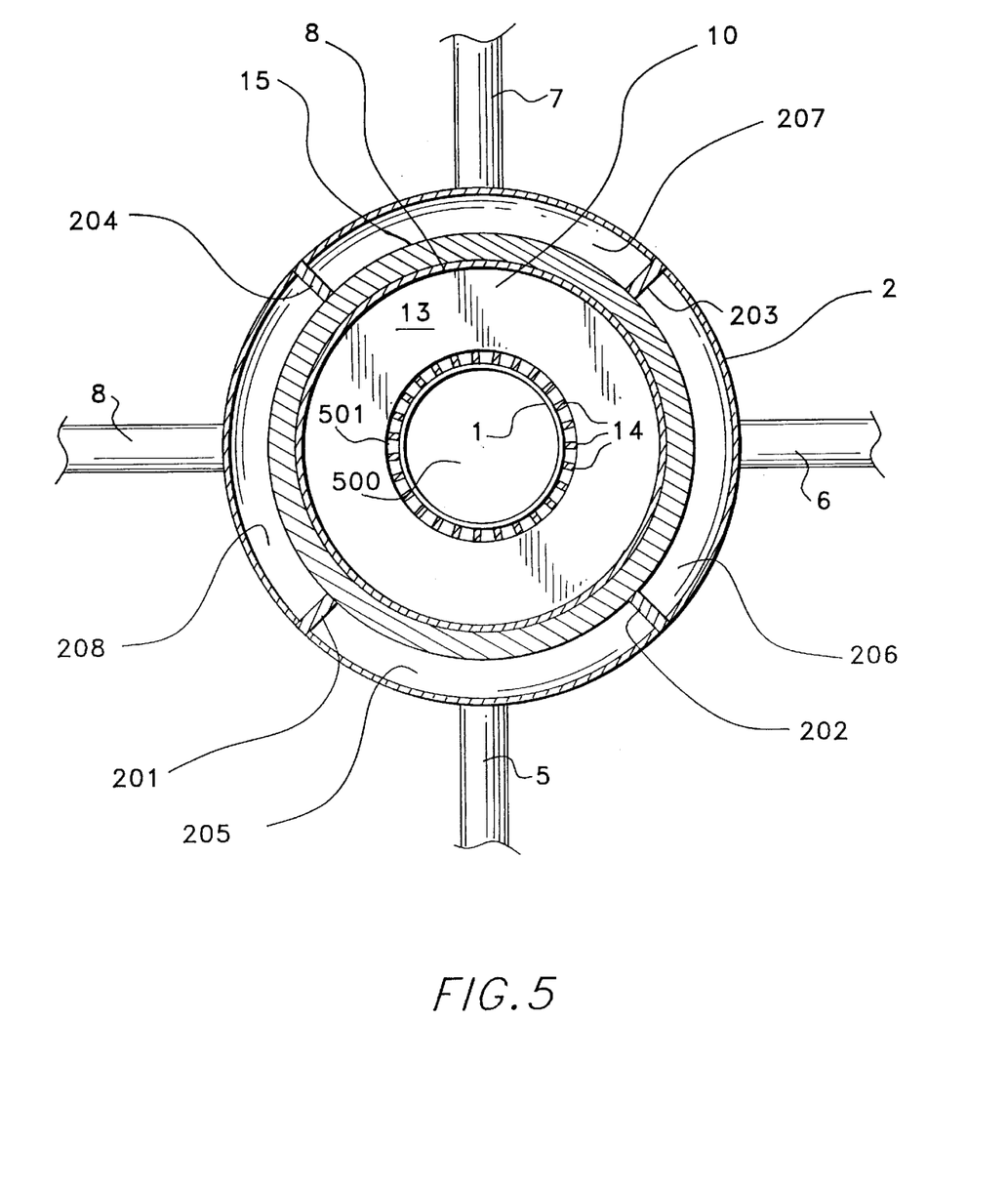
FIG. 5 is a cross sectional view taken along line 5—5 of FIG. 4.
Figure 6:
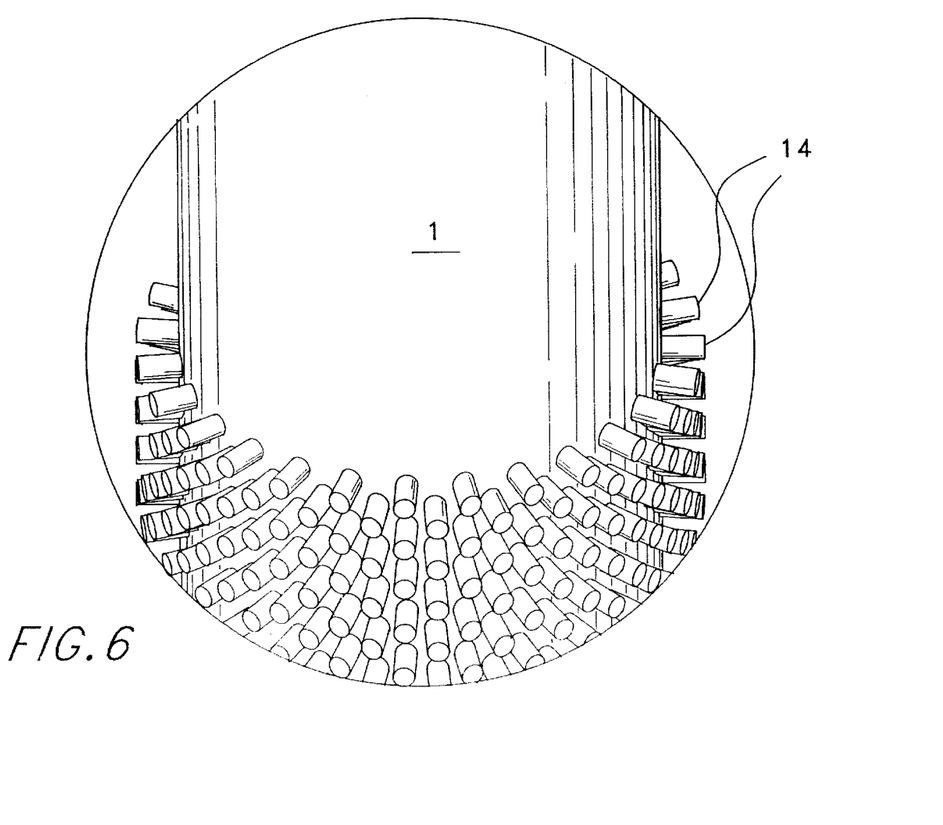
FIG. 6 is a close-up perspective view of the outside of the heat pipe in the preferred embodiment.

Referring next to FIGS. 1 and 5, the air inlet manifold 3 feeds the air inlet pipes A1, A2, A3, A4 with preheated air. Fuel is fed through fuel inlet pipes F1, F2, F3, F4 which mixes in air/fuel inlet pipes 5, 6, 7, 8 and the plenum 2 within the plenum chambers 205, 206, 207, 208. The space inside heat pipe 1 is denoted 500, and the annular space for the exhaust along the outside of the heat pipe 1 is denoted 501.

EXAMPLE

Complete Testing of Hybrid Bench-scale Prototype
Summary:

Heat pipe receivers have been demonstrated to deliver about 20% more engine output in dish/Stirling systems than direct impingement receivers. This is mainly through more uniform delivery of heat to the engine heater heads. A team has been developing heat pipe receivers for a number of years, just recently the team undertook the development of a hybrid heat pipe receiver. The reason for this activity is that hybrid capability is seen as a necessity for most near-term dish/engine deployments.

The long-term objective of this work is to develop a full-scale hybrid heat pipe receiver that would support a 25 $kW_e$ engine. To meet that objective, the team decided to work with a $\frac{1}{6}^{th}$ scale prototype, gas-fired sodium heat pipe and to use that prototype to:

determine heat transfer from the burner to the heat pipe;

determine burner system efficiency;

determine burner system pressure drop;

identify lifetime issues;

evaluate emissions from burner system;

determine practicality of high air preheat (recuperator simulation); and verify models used to predict full-scale performance.

Most of the above items have been addressed, and work is now underway to design the full-scale system. Burner lifetime remains an important issue, but requires extended system run times. The team recently completed a successful 100-hour test. This test begins to validate the longevity of the concept. Detailed data collected so far, and described later in this report, show that heat transfer from the burner to the heat pipe, burner system efficiency, pressure drop, emissions, and high air preheat are all satisfactory and are consistent with desired operation of a full-scale system. That is supported by flow, heat transfer and system models that were validated using data collected with the prototype system. At the present time, the primary concerns are the lifetime of the metal-refractory seals and of the burner matrix.

Objectives:

The team developed a set of critical system requirements for the full-scale hybrid heat pipe receiver that appeared necessary to give an economically and technically viable system. These included:

burner system efficiency of 75% based on fuel higher heating value;

sufficient heat throughput for a 75 $kW_e$ engine;

capital cost penalty no greater than, and preferably less than, a diesel generator set, or about $300 per installed $kW_e$;

air emissions consistent with existing and anticipated regulations;

pressure drop to give reasonable parasitics;

a burner system integrated with the heat pipe; and robust, long-life system.

The prototype heat pipe tests were used to first validate the concept and to then quantitatively evaluate the efficiency, heat throughput, emissions, and pressure drop issues. In addition, operation of the prototype system allowed the team to develop experience with the concept and to evaluate operation and robustness of the concept.

The team qualitatively evaluated numerous burner/heat-pipe concepts before settling on the one shown in FIG. 3. A metal matrix burner was chosen because they are inherently low NOx burners and because they produce a heat flux that is well-matched to that required by a sodium heat pipe. Numerous pins welded to the heat-pipe wall provide sufficient heat transfer surface area at a minimal cost in pressure drop.

Figure 7:
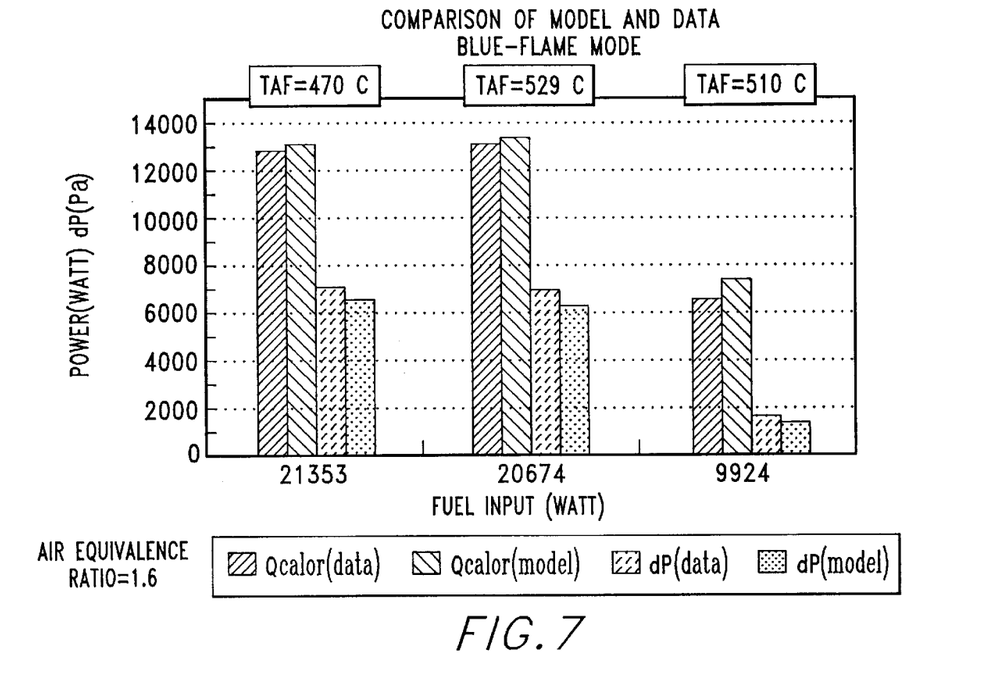
FIG. 7 is a graph showing heat transfer and pressure drop performance of the prototype in blue-flame mode versus model data.
Figure 8:
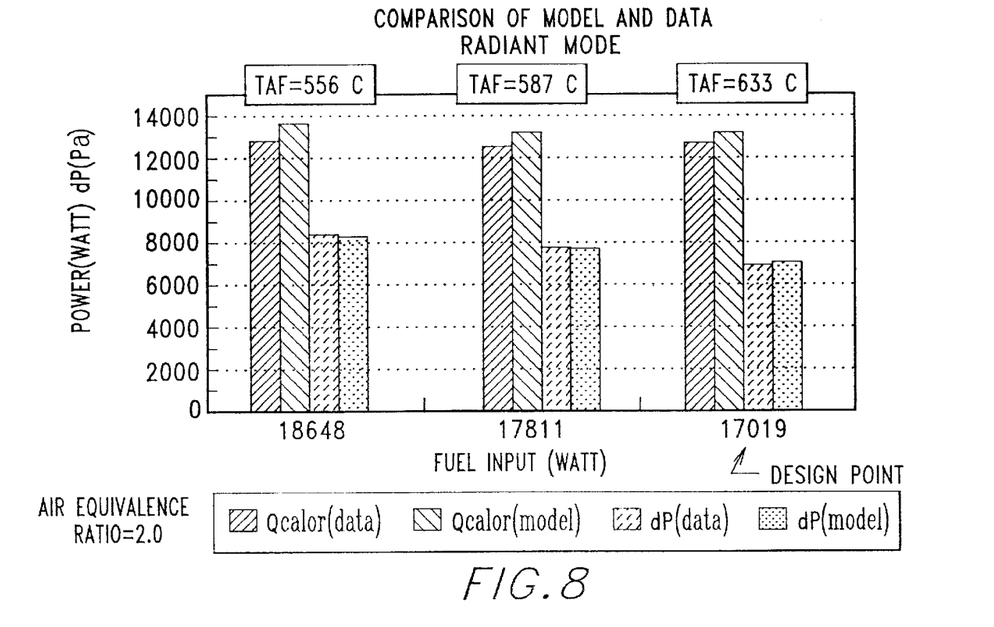
FIG. 8 is a graph showing heat transfer and pressure drop performance of the prototype in the radiant mode versus model data.

Heat Transfer and Pressure Drop Performance:

FIGS. 7 and 8 show measured heat transfer and pressure drop performance for the two-burner operating modes, blue-flame and radiant. The blue-flame mode allows the burner matrix to operate at lower temperatures but requires more combustion air increasing parasitics. In the radiant mode, about 30% of the fuel energy is released as radiant energy from the burner matrix. This reduces the flame temperature and nitrogen oxide (NOx) emissions. In addition, combustion air requirements are lower than in the blue-flame mode reducing parasitics. The main concern with the radiant mode is the higher operating temperature of the burner matrix and potential impact on the matrix lifetime. We initially felt that the radiant mode would produce excessive matrix temperatures and undertook performance testing first in the blue-flame mode. We then performed detailed optical measurements of burner matrix temperatures in the radiant mode and determined that the burner matrix temperatures would likely be acceptable. We then undertook performance testing in the radiant mode.

In FIG. 7 results from 3 runs are presented. Two runs were made at approximately full power and one at approximately half power. The air/fuel preheat temperature was also varied as shown on the chart. Due to preheater limitations, the design air/fuel preheat temperature of 675° C. was not possible. In addition, inadequate air/fuel distribution in the burner inlet plenum did not allow operation as lean as desired. Air fuel ratio for these runs was about 1.6 whereas 2.2 is desired. In the chart, the heat transferred through the heat pipe, as measured by the calorimeter heat transfer, Qcalor, is compared with that predicted by the models. The agreement is very good, typically about 10% and this gives us confidence in our modeling capability. Moreover, because our models showed that a full-scale version of the concept would be viable, and because the models were validated by the prototype data, we have confidence that a full-scale system will work as required.

One can see that the efficiency of the system is about $13/21=62\%$ which is low relative to the goal of 75%. The reason for this is the low air/fuel preheat. The efficiency would have been closer to the desired value of 75% had we achieved the desired 675° C. air/fuel preheat.

Measured and predicted pressure drop also agree quite closely. In addition, these values are reasonable because the system model predicts that overall parasitics will be acceptable with this level of pressure drop, a few percent of the gross electrical power output.

For a robust system, it is important to ensure that component temperatures are kept to reasonable values. Our CFD modeling showed that the most critical temperature would be the pins just downstream of the burner section. The data agreed with the model and showed that these pin temperatures would be about 1050° C. which is a reasonable value for long life.

Another important factor in ensuring a robust system is the seals between the burner system and the heat pipe. These metal-to-refractory seals were designed to contain the combustion gases within the burner flow path in the primary heat exchanger. Through careful measurements, the team was able to verify that less than 1% of this gas flow leaked out the seals, and this appears to be an acceptable leak rate.

An upgrade to the air preheat system was made to allow higher air/fuel temperatures to be achieved. An additional test with the blue-flame mode was then made to verify that we could achieve 675° C. air/fuel preheat without pre-ignition and this gave us further confidence in the CFD models.

In FIG. 8 three runs are presented for the radiant mode of operation. These were all for near-full power operation but with increasing air/fuel temperatures. Again the data and the model agree closely, within about 5% for heat transfer and within about 3% for pressure drop. Here the overall efficiency for the right-most data set (indicated as "Design Point" on the graph) is $12.7/17.0 = 75\%$. This efficiency is the desired value and was achieved because an improved preheater system allowed the necessary air/fuel preheat temperature, properly simulating a recuperator. Depending on burner matrix life, it may be necessary to run slightly leaner than the 2.0 air equivalence ratio used for the tests. In that case, the system efficiency will drop by about 2 percentage points.

The parasitics represented in the above graph would be about 3% of system gross output power, which is acceptable. However, this does not include the recuperator. The team is presently working with a very low pressure drop recuperator design. In the radiant mode, versus the blue-flame mode, lower air/fuel preheat temperatures are needed, about 640° C., to achieve the desired efficiency. The data in FIG. 8 gives further evidence that the required air/fuel preheat is practical and will not necessarily cause pre-ignition.

Figure 9:
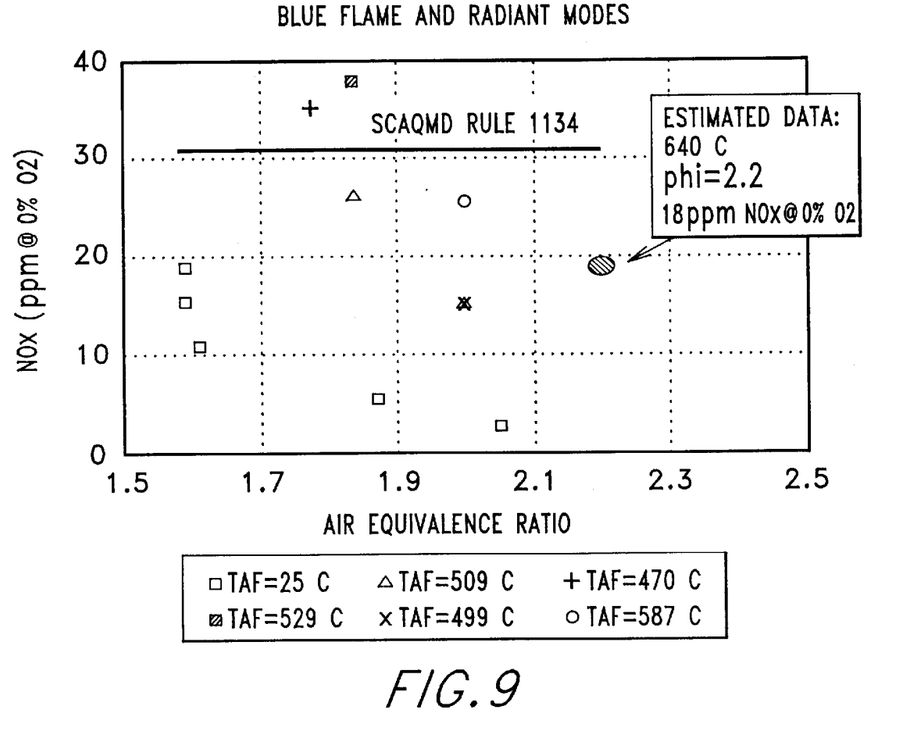
FIG. 9 is a graph showing NOx emissions of the prototype in both blue-flame and radiant modes.

Emissions:

FIG. 9 shows the emissions of oxides of nitrogen for several runs both in the blue-flame and radiant modes. NOx is most strongly affected by air equivalence ratio (air/fuel ratio) and by air/fuel preheat so these are the two primary variables in the graph. Leaner operation significantly reduces NOx and higher air/fuel temperatures increase NOx.

There are presently no emission regulations for dish/Stirling systems. However, there are regulations for a wide range of conventional gas-burning technologies that can provide a reference point until hybrid dish/Stirling emission regulations are put in place. For example, the most stringent regulated NOx emissions are for large (>60 MW) gas turbines operating within the purview of the (California) South Coast Air Quality Management District (SCAQMD), Rule 1134, and this is 31 ppm (corrected to 0% oxygen). It is unlikely that dish/engine systems would be regulated to such a restrictive level of NOx emissions, but this gives us a target. The large data point in FIG. 9 represents an extrapolation of the available data to the expected design operating condition. This data point shows that we expect NOx to be about 18 ppm, well below the SCAQMD value of 31 ppm. More recently, we have validated this extrapolation.

Figure 10:
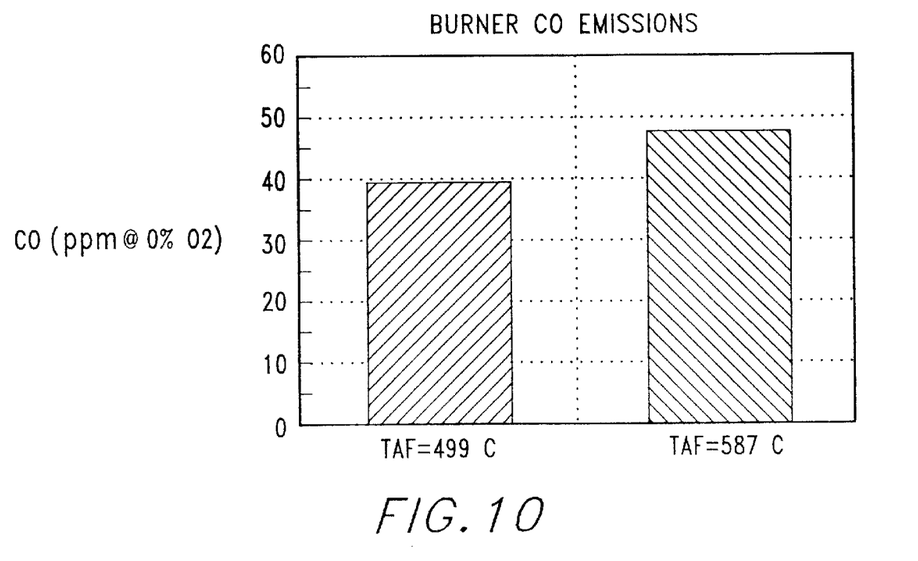
FIG. 10 is a graph showing CO emissions of the prototype.

FIG. 10 shows carbon monoxide emissions for two runs at two different air/fuel preheat temperatures. Matrix burners operating in free air typically have CO emissions significantly below the values shown in FIG. 10, about 12 ppm. We believe the higher CO emissions shown in FIG. 10 is due to the relatively close spacing of the burner matrix to the heat pipe which causes flame quenching and the production of CO. In our first burner/heat pipe test the CO emissions were above the range of the CO analyzer, which is 60 ppm. Actual values were likely much higher than 60 based on the rate of increase we observed in the CO analyzer as it approached saturation. For that reason in the second burner, we provided more space between the matrix and the heat pipe and this considerably reduced CO, into the 40 ppm range as shown below. We are considering an even greater spacing for the full-scale hybrid heat pipe. Although CO is not regulated, we know that a value closer to 12 ppm is achievable and a greater spacing would move us in that direction.

Emissions of total hydrocarbons are extremely low, typically less than 1 ppm for all the runs we made.

Remaining Issues:

Lifetime remains an important issue for the present invention. Although initial testing reported herein focused on the data needed to validate the concept, it will be necessary to gain confidence in lifetime and reliability issues. These are difficult issues because of the very high temperatures present in the burner system. Since we are pushing the capability of the burner matrix lifetime through high preheat temperatures and high heat sink temperatures, it will be necessary through long-term testing to demonstrate survivability of the matrix. The successful 100-hour test is a good start towards that goal.

As mentioned before, another critical area is the burner-heat pipe seals. The team demonstrated effective sealing, but a subsequent seal failure has redirected some effort in this area to ensure a robust system. In addition, the only way to conclusively determine if the burner matrix is operating at a reasonable temperature is to determine the burner lifetime.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A heating apparatus comprising:
    a cylindrical annulus forming an outer plenum;
    said outer plenum having an inside diameter comprising a burner sheet;
    a uniform flow mesh located inside the outer plenum to provide a uniform delivery of an air/fuel mixture circumferentially around said burner sheet;
    a pipe to conduct said air/fuel mixture to said outer plenum;
    an igniter to ignite said fuel mixture on said burner sheet;
    said outer plenum having a continuous curved bell shape without any right angles distal from a connection from the pipe to the outer plenum, thereby preventing a pre-ignition of the air/fuel mixture, and causing a uniform burning in the burner sheet.

2. The apparatus of claim 1, wherein said outer plenum further comprises at least four air/fuel mixture inlet pipes equally spaced feeding into said outer plenum, wherein a residence time of the air/fuel mixture in the plenum and feed piping is reduced to less than 100 milliseconds.

3. The apparatus of claim 1, wherein said burner sheet is a cylindrical ring.

4. The apparatus of claim 2, wherein the outer plenum further comprises a divider vane between each inlet pipe.

5. The apparatus of claim 3, wherein said burner sheet is selected from a group consisting of a porous metal and a ceramic.

6. The apparatus of claim 5, wherein said burner sheet has a pore size sufficiently small to prevent upstream flame propagation but large enough to minimize a pressure drop across said burner sheet.

7. The apparatus of claim 1, wherein said uniform flow mesh comprises a wire mesh pad having a pressure drop of more than one inch of water column.

8. The apparatus of claim 3, further comprising a piping or duct which has an outer surface a distance away from said cylindrical ring burner sheet to effect a heat transfer from said burner sheet to said piping or duct.

9. The apparatus of claim 1, wherein the air/fuel mixture is pre-heated between 640° C.–675° C. before entering the outer plenum.

10. The apparatus of claim 1, wherein a fuel ignition point is less than 2 cm from the burner matrix.

11. The apparatus of claim 1, wherein the air/fuel mixture further comprises 50%–150% excess air.

12. The apparatus of claim 1, wherein the air/fuel mixture further comprises a fuel injection point located at a distance of at least 50 mm upstream from the burner sheet.

13. An inward burning burner comprising:
an outer plenum having at least four air/fuel inlet ports and a cylindrical inside burner matrix which in turn has an inward burning combustion surface and an outside surface;
an air/fuel pre-heater feeding said four air/fuel inlet ports;
a porous mesh surrounding said outside surface;
a fuel injection point for each of said inlet ports at least 50 mm upstream from said combustion surface;
an igniter; and
said outer plenum having a continuous curved bell shape without any right angles distal from a connection from the pipe to the outer plenum, thereby preventing a pre-ignition of the air/fuel mixture, and causing a uniform burning in the burner sheet.

14. The burner of claim 13 further comprising a divider vane between each of said inlet ports inside the plenum.

15. The burner of claim 13 further comprising a residence time of the air/fuel mixture in the plenum of less than 100 msec.

16. An inward burning gas burner comprising:
a curved outer plenum having at least four air/fuel inlet ports;
said outer plenum having a cylindrical inside diameter forming a burner matrix;
a porous mesh surrounding said burner matrix to provide a pressure drop in excess of one-inch water column across the combined thickness of the burner matrix and the porous mesh; and
said outer plenum having a continuous curved bell shape without any right angles distal from a connection from the pipe to the outer plenum, thereby preventing a pre-ignition of the air/fuel mixture, and causing a uniform burning in the burner sheet.

17. The burner of claim 16, wherein each air/fuel inlet port has an air/fuel preheater and an upstream air/fuel mixing point at a length sufficient to mix the air and fuel uniformly and short enough to prevent pre-ignition.

18. The burner of claim 17 further comprising a divider vane between each air/fuel inlet port inside the outer plenum.

19. The apparatus of claim 9, wherein a pre-heated temperature of over 600° C. is achieved.

20. The apparatus of claim 19, wherein a burner temperature of at least 1000° C. is achieved.

21. The apparatus of claim 8, wherein the piping or duct further comprises pin fins to further enhance the heat transfer.

22. The apparatus of claim 20 further comprising a refractory surrounding a heat pipe and forming a gap between itself and the heat pipe to form an exhaust outlet along a length of the heat pipe thereby further enhancing the heat transfer.

23. The apparatus of claim 22, wherein the heat pipe further comprises a heated fluid flowing therein.

24. The apparatus of claim 23, wherein the heat pipe further comprises pin fins, and wherein the exhaust gas flows first in a radial direction along a central pin axes and then turns across the central pin axes and out the exhaust outlet formed by the gap.

* * * * *